No. 885,986. PATENTED APR. 28, 1908.
L. H. DYER.
TRANSMISSION GEAR FOR MOTOR VEHICLES.
APPLICATION FILED JAN. 22, 1906.

Witnesses:
Jas. F. Coleman
John Hobal

Inventor.
Leonard H. Dyer
By Dyer & Dyer
Attorneys.

No. 885,986.

PATENTED APR. 28, 1908.

L. H. DYER.

TRANSMISSION GEAR FOR MOTOR VEHICLES.

APPLICATION FILED JAN. 22, 1906.

Witnesses:

Inventor

Leonard H. Dyer

By Dyer & Dyer

Attorneys.

UNITED STATES PATENT OFFICE.

LEONARD H. DYER, OF NEW YORK, N. Y.

TRANSMISSION-GEAR FOR MOTOR-VEHICLES.

No. 885,986.

Specification of Letters Patent.

Patented April 28, 1908.

Application filed January 22, 1906. Serial No. 297,116.

*To all whom it may concern:*

Be it known that I, LEONARD H. DYER, a citizen of the United States, residing in the borough of Manhattan, city, county, and State of New York, have invented certain new and useful Improvements in Transmission-Gear for Motor-Vehicles; and I do hereby declare the following to be a full, clear, and exact description of the invention, which will enable others skilled in the art to which it appertains to make and use the same.

This invention in motor-vehicles relates principally to transmission mechanism usually called "transmission-gear", interposed between the engine, usually an internal combustion engine, and the driving shaft or wheels, and is a division of an application for patent filed by me on the 3rd of February, 1900, Serial 3880.

The object of my invention is to simplify and improve the construction and operation of the transmission mechanism or gear.

My invention will be best described from a detailed description from one embodiment thereof, shown in the accompanying drawings, wherein.

In all of the several views like parts are designated by the same letters of reference.

Figure 1:
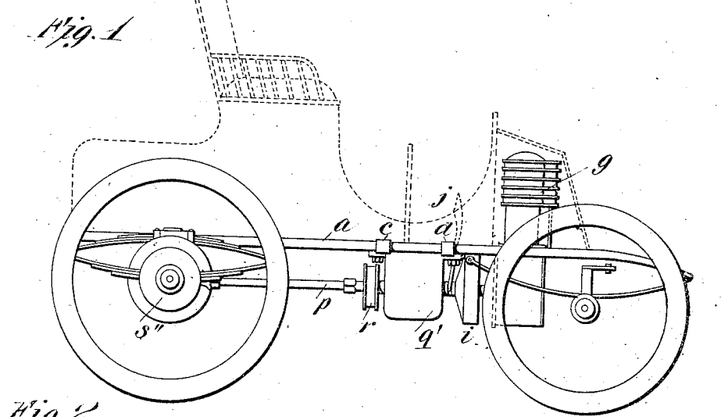
Figure 1 is a side view of a motor-vehicle embodying my invention, the body portion being shown in broken lines.
Figure 2:
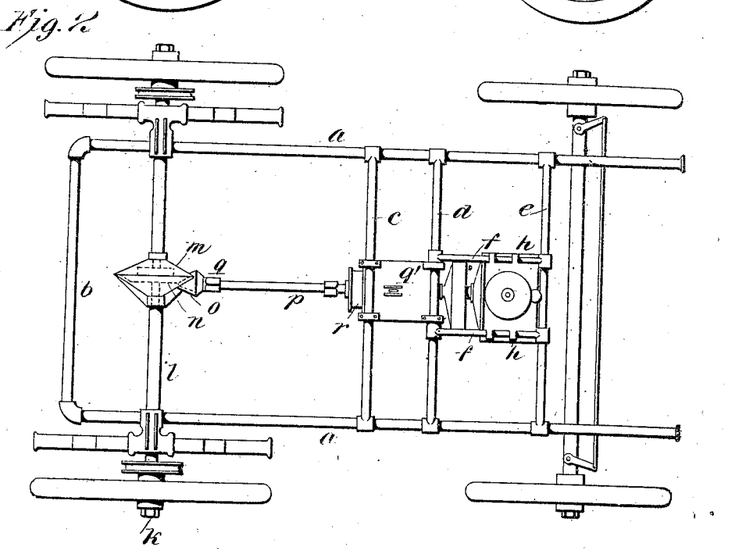
Fig. 2 is a top view of the same.

Referring to Figs. 1 and 2, one form of frame is shown which consists of two parallel side members $a$, $a$, which are bent or curved down at their forward extremities to connect with the two forward springs, and are connected together by means of the cross members $b$, $c$, $d$, and $e$. With these are combined the short lateral members $f$, $f$, to which is secured the motor $g$ by means of clips $h$, as shown. The motor $g$ is an explosive engine of the internal combustion type, and is illustrated as of vertical form, but the invention is not limited to the form or details of the engine. The motor shaft is arranged in a longitudinal direction, that is to say, at right angles to the supporting axles. The fly-wheel of the engine is shown as combined with the clutch $i$ with a foot lever $j$ for disengaging the two parts of the clutch, a spring being used to keep them normally in engagement, as is well known in the art. As the construction of the clutch is not a part of this invention, it will not be described, it being understood that any well known form of clutch may be employed, and is not necessarily attached to the fly-wheel.

As shown in the drawings, the rear axle $k$ is mounted within the bridge $l$ and is cut or broken adjacent to the center thereof. The differential $m$ connects with and supports the bevel gear wheel $n$, which engages in the bevel pinion $o$, all shown in broken lines in Fig. 2. The differential and bevel gears are suitably incased, as shown. It is, of course, understood that the differential $m$ may be placed upon a counter shaft, which will be supported by bearings on the frame in the well known manner and motion will be transmitted from the counter shaft to the rear wheels in the usual way.

The longitudinal shaft $p$ is provided with knuckle or universal joints $q$ thereon to allow it to run freely irrespective of the relative positions of the carriage-body and the bridge $l$. The shaft $p$ is connected to the differential, and the motor shaft, through the agency of the clutch, and together with the motor shaft and clutch serves as a driving means between the motor and the axle, or the connecting shaft, if used. A drum $r$ is provided for a band brake to engage with, and additional drums $s''$ may be arranged upon the hubs or naves of the rear wheels for auxiliary or emergency brakes.

The operation of so much of the invention as has been described is as follows: The friction clutch $i$ being disengaged, as for instance by means of the lever $j$ the motor can be started and allowed to run freely without it moving the vehicle. To start the vehicle the clutch is gradually applied whereby motion is transmitted by means of the longitudinal shaft $p$ through the knuckle joints to the bevel pinions $o$, and from there to the large bevel gear $n$ to the differential, thence to the rear axle and rear wheels. The shaft of the motor $g$ is preferably upon the same horizontal plane as the rear axle $k$. The shaft is also arranged within the center line of the vehicle. The vibration and the oscillation of the carriage-body and frame will, therefore, affect the free rotation of the shaft but little. The driving means which comprises the motor shaft and the shaft $p$ extend along in a straight line, as illustrated, and will be practically the same as a single shaft, and will not be deflected except by vibrations or oscillations of the springs and body. If desired, the shafts may not extend along a straight line shown, but such a construction I do not prefer. Any deflections which may appear will be remedied by the knuckle joints, and there being but one pair of gears, and these being incased, the noise of the machinery will be reduced to a minimum.

Figure 3:
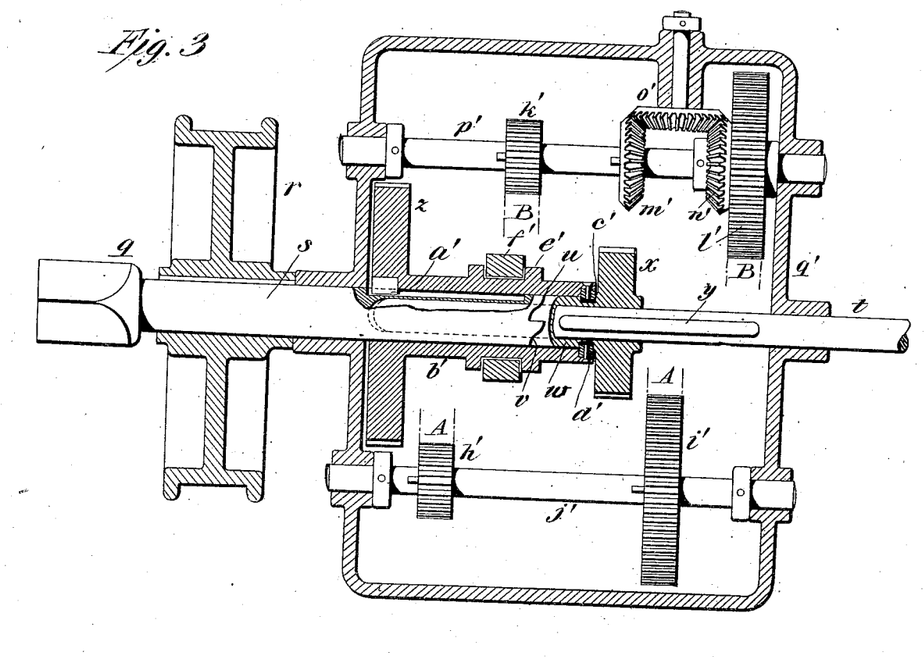
Fig. 3 is a enlarged view partly in section, of the transmission-gear.
Figure 4:
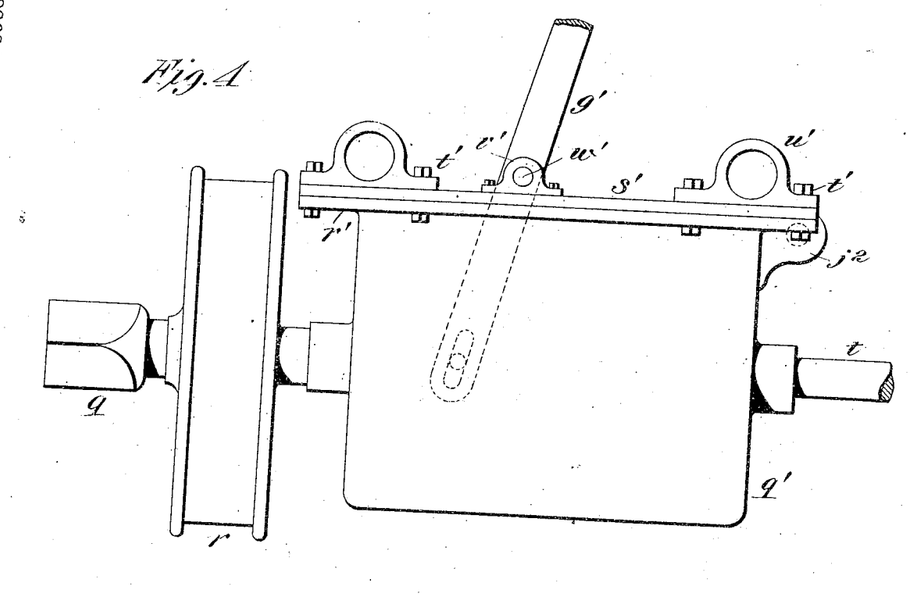
Fig. 4 is a side view of the gear case.

In Figs. 3 and 4 are shown the low speed and reversing gear. For the purpose of introducing this gear the longitudinal shaft $p$ is divided into two parts to form separate shafts $s$ and $t$, the driving part $t$ telescoping within the driven part $s$ and turning freely therein. The two shaft parts are caused to rotate together by means of suitable locking mechanism, as a jaw clutch, one member $u$ being formed integrally with the shaft $s$, while the other part consists of jaws $v$ formed upon a moving member $w$. The member $w$ is integrally formed with a pinion $x$ and the two are supported upon the shaft part $t$ and turn therewith by means of a feather $y$.

On the shaft $s$ is mounted a gear $z$ which turns therewith, may be slid along it by means of a feather $a'$ or any other suitable arrangement. The sleeve $b'$ to which the gear $z$ is attached surrounds the shaft $s$ and also the moving member $w$ of the jaw clutch, a ring or finger $c'$ engaging with the depression or groove $d'$ in the latter. A groove $e'$ is formed in the sleeve $b'$ for the support of the ring $f'$ which engages with and is actuated by a lever $g'$ (see Fig. 4). The latter is used for shifting the sleeve $b'$ along the shaft $s$, and with it, the gear $z$, together with the movable member of the jaw clutch $w$ and the pinion $x$, the two latter parts moving by the engagement of the ring $c'$ with the grooves $d'$. The gear $z$, pinion $x$, and movable member $w$, constitute a single shiftable element. When moved to the position shown in dotted lines in Fig. 3 at "A" the gear $z$ and the pinion $x$ will engage with the pinion $h'$ and the gear $i'$ respectively, which are both supported upon and secured to a short auxiliary shaft $j'$ mounted in bearings so as to be parallel with the shafts $s$ and $t$. When the gear $z$ and pinion $x$ are in a position "A", the jaw clutch $u$ will be disengaged and the shafts $t$ and $s$ forming parts of the shaft $p$ will be caused to rotate at different rates of speed. Such will be the case if the gears are proportioned as shown in the drawings.

To provide a reversing gear, the additional gear $l'$ and pinion $k'$ are located in the position "B". This gear and pinion are supported upon a shaft $p'$, and the pinion $k'$ is secured thereto. The gear $l'$ is free to turn upon the shaft $p'$, and is connected to, or is joined integrally with a bevel or miter gear $n'$, which intermeshes with a bevel gear $o'$, supported upon a short shaft mounted in fixed bearings on the case $q'$. A third bevel gear $m'$ is secured to the shaft $p'$ and intermeshes with the bevel gear $o'$.

The shafts $s$, $t$, $j'$ and $p'$ are supported in bearings which are preferably formed integrally with a gear box $q'$. The latter is provided with a flange $r'$ at the top and a cover $s'$, the two being secured together by means of bolts $t'$. The entire gear case is supported upon the cross members $c$ and $d$ of the vehicle frame by means of the clips $u'$ which are secured to the corners of the cover $s'$ by means of the same bolts $t'$ which secure the top to the case. A pair of lugs or ears $y'$ provide a bearing for the pin $w'$ upon which is mounted the shifting lever $g'$.

The operation of the low speed and reversing gear is as follows: While running at the normal rate of speed the parts are in the position shown in Fig. 3, the two shafts $s$ and $t$ forming the shaft $p$ being for all practical purposes one single shaft. The gears $x$ and $z$ being out of the mesh with the secondary gears, they and the auxiliary shaft are at rest. To change gear friction clutch $i$ is first disengaged, and the gears $x$ and $z$, together with the movable member of the jaw clutch are moved to the position "A" by means of the lever $g'$. The friction clutch $j$ is then reëngaged. Power will now be transmitted from the forward shaft $t$ to the rear shaft $s$ by means of the pinion $x$ in engaging with the gear $i'$, and the latter revolving the pinion $h'$ which is in engagement with the gear $z$ will rotate the rear shaft $s$ at a lower rate of speed, but in the same direction.

To reverse, the carriage is first brought to a state of rest, and upon the clutch $j$ being disengaged, the gears $x$ and $z$ are brought to the position "B". The friction clutch being reëngaged, motion will be imparted from the front shaft $t$ to the rear shaft $s$ through the pinion $x$ gear $l'$, miter gears $m'$, $n'$ and $o'$, shaft $p'$, and pinion $k'$ and gear $z$. The gear $k'$ and shaft $p'$ will rotate in the opposite direction from the gear $l'$ and consequently the shaft $s$ will rotate in an opposite direction from the shaft $t$ and will cause the vehicle to travel backwards.

By my invention the various gear wheels are caused to engage or intermesh by means of a sliding movement. This engagement is caused by sliding one or both of the pair of gear wheels along their supporting shafts, or by sliding their supporting shafts in their bearings, or by some other means to cause the two gear wheels to intermesh by means of a relatively axial or longitudinal movement. This sliding movement is to be distinguished from a rolling movement made by causing the two gear wheels to approach each other in a lateral direction, or to relatively travel on a path at right angles to their axes. Additional low speed gears can be arranged by the addition of auxiliary shafts and secondary gears.

Figure 5:
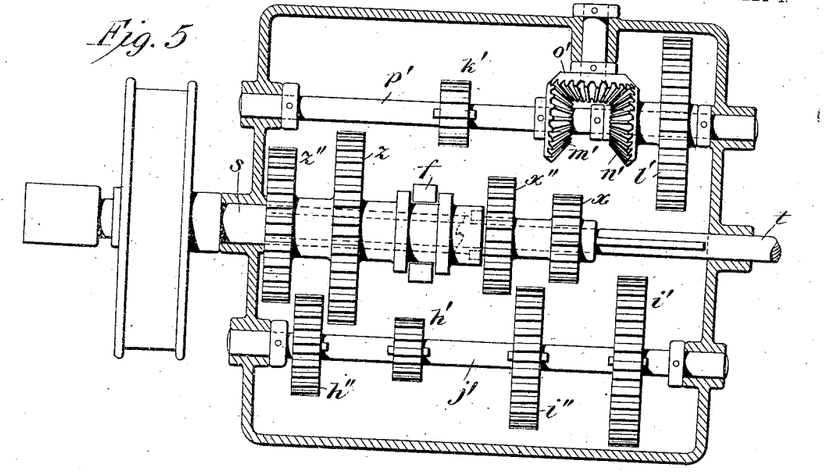
Fig. 5 is an enlarged view, partly in section, of a modified form of transmission gear.
Figure 6:
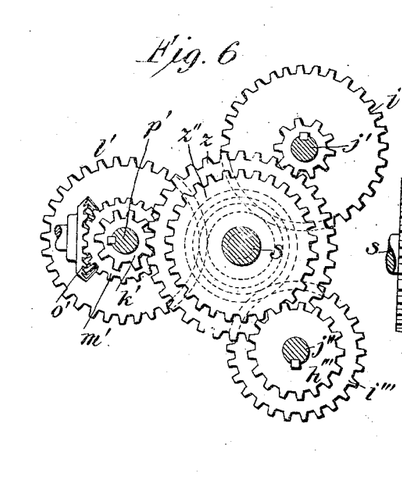
Fig. 6 is an end view of another modification.
Figure 7:
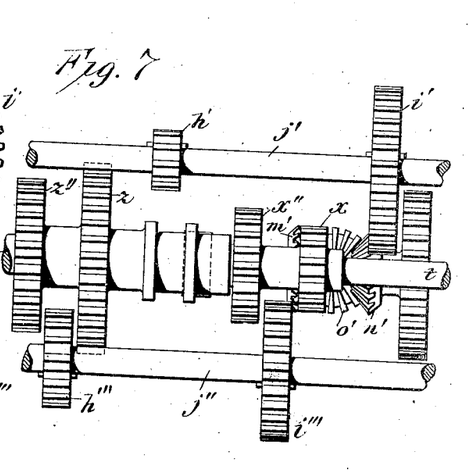
Fig. 7 is a side view of the same.

Figs. 5, 6 and 7 show ways in which this may be accomplished. In the device illustrated in Fig. 5, additional forward speeds are secured by the addition of extra secondary gears upon one of the auxiliary shafts, together with extra gears on the main driving shaft. As shown in the figure, an extra gear $x''$ is coupled to move with the gear $x$ and is adapted to engage with the gear $i''$ carried by the shaft $j'$. A gear $z''$ is coupled to move with the gear $z$ and is adapted to engage with the gear $h''$ on the same shaft $j'$. In sliding the moving element which includes the gears $x$, $x''$, and $z$, $z''$, the clutch will be first disengaged and the gears $z'$ 'and $h''$ and $x''$ and $i''$ will be intermeshed, driving the shaft part $s$ at a lower speed but in the same direction as when coupled directly to the shaft $t$. By sliding the gears $x$, $x''$, $z$, $z''$ to cause the gears $x$ and $i''$ and $z$ and $h'$ to intermesh, a third forward speed will be produced in the same direction but at less speed than the second. By continuing the sliding movement of the gears, the gears $x$ and $l'$ and $z$ and $k'$ will be intermeshed for driving the shaft part $s$ in reverse direction.

An embodiment of the invention showing additional speeds forward, by means of the addition of an auxiliary shaft, is shown in Figs. 6 and 7. An additional shaft $j''$ is provided, having gears $l'''$, which is adapted to be engaged by the gear $x''$, and a gear $h'''$, which is adapted to be engaged by the gear $z''$. The shaft $j'$, with the gears $h'$ and $i'$ are the same as those illustrated in Fig. 3.

The novel features of the automobile aside from the transmission gear, are not claimed in this application, but form the subject matter of an application filed by me February 3rd, 1900, Serial No. 3880.

Having now described my invention, what I claim as new, and desire to secure by Letters Patent, is:—

1. In a transmission-gear for automobiles, the combination of a driving member, a driven member, a driving-gear for the former, a plurality of intermediate gears, including a reversing-gear, and means, including mechanism shiftable as an entirety, for driving said driven member through any one of said intermediate gears.

2. In a transmission-gear for automobiles, the combination of a driving member, a driven member, a driving-gear for the former, a plurality of intermediate gears, including a reversing-gear, and means, including mechanism shiftable as an entirety, for coupling said driving member to said driven member and for also driving said driven member through any one of said intermediate gears.

3. Transmission mechanism for motor-vehicles, the same comprising a driving member, a driven member, means to couple said driven member to said driving member to be driven by the latter and means comprising mechanism shiftable as an entirety to drive said driven member at a different speed from said driving member and to drive said driven member in reverse direction from said driving member.

4. Transmission mechanism for motor-vehicles, the same comprising a driving member, a driven shaft axially alined therewith, means to couple said member and shaft one to the other for direct drive of the latter by the former, a plurality of gears arranged out of line with the axis of said shaft and driven by said member, and a shiftable transmission device on said shaft and adapted to engage the said plurality of gears to drive said shaft in the same, and also in a reverse direction.

5. In a transmission-gear for automobiles, the combination of a driving member, a driven member, and means comprising mechanism shiftable as an entirety coupling said driving member to said driven member to drive the latter from the former and for varying the speed and direction of movement transmitted from said driving member to said driven member.

6. Transmission mechanism for automobiles, the same comprising a driving-shaft, a plurality of fixed intermediate gears, including a reversing-gear, means for supporting said gears, a driven shaft and means comprising a longitudinally shiftable transmission device to rotate the latter from the driving-shaft through any one of said intermediate gears.

7. Transmission mechanism for automobiles, the same comprising a driving-shaft, gear supporting means driven therefrom at a reduced speed, a plurality of fixed intermediate gears, including a reversing-gear, a driven shaft and means comprising a longitudinally shiftable transmission device to rotate the latter from the driving-shaft through any one of said intermediate gears.

8. Transmission mechanism for motor-vehicles comprising a driving member, a driven member, a shiftable transmission member, means coördinate therewith to couple said driven member to said driving member, one or more stationary intermediate gears driven by said driving member and means to bring said transmission member into separate engagement and disengagement with said one or more intermediate gears.

9. Transmission mechanism comprising a driving member and a driven member adapted to be driven one by the other at the same speed, at different speeds, or in a reverse direction and mechanism longitudinally shiftable as an entirety for obtaining such changes in speed and direction.

10. Transmission mechanism for motor-vehicles comprising a driving member, a driven shaft axially alined therewith, a shiftable transmission device on said shaft, means for coupling said driving member and said driven shaft, one to the other for the direct drive of the latter by the former, one or more stationary gears arranged at one side the axis of said shaft and driven by said driving member, and means to shift said transmission device into engagement with the said one or more gears.

11. In a motor-vehicle, a motor, clutch, driving-gear and driven shaft all axially alined, intermediate gears between said driven shaft and said driving-gear, mechanism shiftable as an entirety to couple said driven shaft to said driving-gear and to drive said shaft from said driving-gear through any one of said intermediate gears, a jack-shaft arranged at an angle with said driven shaft and driven therefrom, and vehicle driving-wheels connected with and driven from said jack-shaft.

12. In a motor-vehicle, a motor, clutch, driving-shaft and driven shaft all axially alined, means comprising mechanism shiftable as an entirety for varying the speed and direction of movement transmitted from said driving-shaft to said driven shaft, a jack-shaft arranged at an angle with said driven shaft and driven therefrom, and vehicle driving wheels connected with and driven from said jack-shaft.

13. In a transmission-gear for automobiles, the combination of a driving member, a driven member axially alined therewith, and means comprising mechanism shiftable as an entirety to couple said driving and driven members together and to vary the speed and direction of movements transmitted from said driving member to said driven member.

14. In a speed-changing gear for motor vehicles, the combination with a motor-shaft, a driven shaft, means for directly connecting the two together to secure high-speed, a low-speed gearing consisting of a plurality of gear-wheels, caused to engage by longitudinal shifting movements, and means for producing reverse rotation of the driven shaft.

15. In a motor vehicle, the combination with the motor, and driving wheels, of a gearing connecting the driving wheels and motors, the said gearing comprising a longitudinal shaft, and a clutch connecting the shaft to the motor, and by means of which it will be driven, of means for rotating the wheels and a portion of the shaft at a different speed ratio, the said means including a jaw clutch and longitudinally sliding gears, a single lever for sliding the gears, and engaging and disengaging the jaw clutch, and a reverse gearing, and means operated by the said lever for engaging the reverse gearing.

16. In a motor vehicle, the combination with a driving motor and driving wheels, of a gearing connecting the two, the said gearing comprising longitudinally alined driving and driven shafts, and a clutch connecting the driving shaft to the motor, and by means of which it will be driven, connections between the driven shaft and the driving wheels, gearing connecting the longitudinal shafts to positively drive the driven shaft at low or high speed, and comprising longitudinally sliding gears and a second clutch, and a single manually operated sliding device for sliding the gears, and for engaging and disengaging the second clutch.

17. In a motor vehicle, the combination with a driving motor and driving wheels, of a gearing connecting the two, the said gearing comprising longitudinally alined driving and driven shafts and a clutch connecting the driving shaft to the motor, and by means of which it will be driven, connections between the driven shaft and the driving wheels, gearing connecting the longitudinal shafts to positively drive the driven shaft at low or high speed, and comprising longitudinally sliding gears and a second clutch, and a single actuating lever for sliding the gears, and for engaging and disengaging the second clutch.

18. In a motor vehicle, the combination with the motor and driving wheels, of a gearing connecting the two, the said gearing comprising longitudinally alined driving and driven shafts, and a clutch for connecting the two, for driving the driven shaft at high speed, and reduced speed gearing for positively driving the driven shaft at a reduced speed, and means for engaging the said reduced speed gearing, the said reduced speed gearing being entirely disconnected when not in use, and being introduced and disengaged by a longitudinally sliding movement.

19. In a motor vehicle, the combination with the motor and driving wheels, of a gearing connecting the two, the said gearing comprising longitudinally alined driving and driven shafts, and a clutch for connecting the two, for driving the driven shaft at high speed, and reduced speed gearing and reverse gearing for positively driving the shaft at a reduced speed, or in the reverse direction, and means for engaging the said reduced speed gearing and reverse gearing, the said reduced speed gearing and reverse gearing being entirely disconnected when not in use, and being introduced and disengaged by a longitudinally sliding movement.

20. In a motor vehicle, the combination with the motor and driving wheels, of a gearing connecting the two, the said gearing comprising a longitudinal shaft, a clutch connecting the shaft to the motor, and by means of which it is driven, connections between the shaft and the driving wheels, and a change speed device for rotating a portion of the shaft at a less speed than the motor, the said change speed device comprising an auxiliary shaft, mounted in rigid bearings, gears on the auxiliary shaft, and gears on the longitudinal shaft, and means for intermeshing the gears by a sliding movement.

21. In a motor vehicle, the combination with the motor and driving wheels, of a gearing connecting the two, the said gearing comprising a longitudinal shaft, a clutch connecting the shaft to the motor, and by means of which it is driven, connections between the shaft and the driving wheels, and a change speed device for rotating a portion of the shaft at a less speed than the motor, the said change speed device comprising an auxiliary shaft, mounted in rigid bearings, gears on the auxiliary shaft, and gears on the longitudinal shaft, and means for intermeshing the gears by a sliding movement, the said means comprising a single manually operated lever.

22. In a motor vehicle, the combination with the motor and driving wheels, of a gearing connecting the two, the said gearing comprising a longitudinal shaft, a clutch connecting the shaft to the motor, and by means of which it is driven, connections between the shaft and the driving wheels, and a change speed device for rotating a portion of the shaft at a less speed than the motor, the said change speed device comprising an auxiliary shaft, mounted in rigid bearings, gears rigidly mounted on the auxiliary shaft, and gears on the longitudinal shaft, and means for intermeshing the gears by a sliding movement.

23. In a motor vehicle, the combination with a driving shaft made in two parts, of a clutch made in two parts and connecting the shaft parts, one of the clutch parts sliding upon its supporting shaft part, a gear connected to the sliding clutch part and sliding with it, a gear on the other shaft part and rotating with it, an auxiliary shaft, gears thereon, and means for sliding the moving clutch part and its companion gear to disengage the two shaft parts and engage the gear with a gear on the auxiliary shaft to cause the two shaft parts to rotate at a different speed relation.

24. In a motor vehicle, the combination with a driving shaft made in two parts, of a clutch made in two parts, and connecting the shaft parts, one of the clutch parts sliding upon its supporting shaft part, a gear connected to the sliding clutch part and sliding with it, a gear on the other shaft part and rotating with it, an auxiliary shaft, gears thereon, the said shaft being mounted in rigid bearings, and means for sliding the moving clutch part and its companion gear to disengage the two shaft parts and engage the gear with a gear on the auxiliary shaft to cause the two shaft parts to rotate in a different speed relation.

25. In a motor vehicle, the combination with a driving shaft made in two parts, of a clutch made in two parts and connecting the two shaft parts, one of the clutch parts sliding upon its supporting shaft part, a gear connected to the sliding clutch part and sliding with it, a gear on the other shaft part and rotating with it, an auxiliary shaft, gears thereon, the gears being rigidly mounted on the shaft, and means for sliding the moving clutch part and its companion gear to disengage the two shaft parts and engage the gear with a gear on the auxiliary shaft to cause the two shaft parts to rotate in a different speed relation.

26. In a motor vehicle, the combination with a driving shaft made in two parts, of a gear case, bearings on the gear case for the shaft parts, a clutch made in two parts and connecting the two shaft parts, one of the clutch parts sliding upon its supporting shaft part, a gear connected to the sliding clutch part and sliding with it, a gear on the other shaft part and rotating with it, an auxiliary shaft, mounted in rigid bearings carried by the gear case, gears movable in a fixed plane with respect to said shaft, on the auxiliary shaft and means for longitudinally sliding the moving clutch part and its companion gear to disengage the two shaft parts and engage the gear with a gear on the auxiliary shaft to cause the two shaft parts to rotate in a different speed relation.

27. In a motor vehicle, the combination with a driving shaft made in two parts, of a gear case, bearings on the gear case for the shaft parts, a clutch made in two parts and connecting the two shaft parts, one of the clutch parts sliding upon its supporting shaft part, a gear connected to the sliding clutch part and sliding with it, a gear on the other shaft part and rotating with it, an auxiliary shaft, mounted in rigid bearings carried by the gear case, gears on the auxiliary shaft, the said gears being rigidly mounted on the shaft, and means for sliding the moving clutch part and its companion gear to disengage the two shaft parts and engage the gear with a gear on the auxiliary shaft to cause the two shaft parts to rotate in a different speed relation.

28. In a motor vehicle, the combination with a shaft made in two parts, of a gear case, bearings on the gear case for the shaft parts, a clutch made in two parts and connecting the two shaft parts, one of the clutch parts sliding upon its supporting shaft part, a gear connected to the sliding clutch part and sliding with it, a gear on the other shaft part and rotating with it, an auxiliary shaft, mounted in rigid bearings carried by the gear case, gears on the auxiliary shaft, and means carried within the gear case for sliding the moving clutch part and its companion gear to disengage the two shaft parts and engage the gear with a gear on the auxiliary shaft to cause the two shaft parts to rotate in a different speed relation.

29. In a motor vehicle, the combination with a driving shaft made in two parts, of a gear case, bearings on the gear case for the shaft parts, a clutch made in two parts and connecting the two shaft parts, one of the clutch parts sliding upon its supporting shaft part, a gear connected to the sliding clutch part and sliding with it, a gear on the other shaft part and rotating with it, an auxiliary shaft, mounted in rigid bearings carried by the gear case, gears on the auxiliary shaft, the said gears being rigidly mounted on the shaft, and means carried within the gear case for sliding the moving clutch part and its companion gear to disengage the two shaft parts and engage the gear with a gear on the auxiliary shaft to cause the two shaft parts to rotate in a different speed relation.

30. A motor vehicle having driving wheels, a motor, a shaft in line with the motor shaft, a clutch connecting the two to cause the shaft to rotate at the same speed as the motor, the shaft being longitudinally arranged between the driving wheels and divided into two sections, a device for connecting and disconnecting the two sections for causing them to rotate as an entirety or to permit independent rotation, means for rotating the rear section of the shaft at a lesser speed than the motor or in a reverse direction, said means including sliding gears, longitudinally movable in a fixed plane with respect to said shaft and mechanism for so moving said gears, and connections between the rear section of said shaft and the driving wheels, substantially as set forth.

31. In a motor vehicle, the combination with a shaft formed of two parts, a connecting clutch and a gear on each shaft part, of a second shaft and gears thereon, and a single lever for shifting the gears on the first shaft and actuating the clutch, substantially as set forth.

32. Transmission gearing for a motor vehicle, having a shaft formed of two parts, one telescoping within the other, a connecting clutch, a gear carried by one clutch member, a second gear, connected to the first gear but freely rotatable with respect thereto, a second shaft, and gears thereon and a single lever for shifting said first gears and actuating the clutch, substantially as described.

33. In a motor vehicle, the combination with a shaft formed of two parts, of a clutch connecting the two parts, a sleeve surrounding the abutting ends of the two parts, a gear formed integral with the clutch, and engaging with one part, a second gear formed integral with the sleeve and engaging with the other part, an auxiliary shaft, gears thereon disengaged at the high speed, intermediate gears interposed between the gears on the second shaft, and means for moving the sleeve, clutch and gears to disengage the two shaft parts and intermesh the gears, whereby the two parts of the shaft may be caused to rotate in different speed relations, substantially as described.

34. Transmission gearing for a motor vehicle having, a shaft formed of two parts, one telescoping within the other, a connecting clutch, a gear integrally formed upon one clutch member, a second gear, a sleeve thereon, connecting with but freely rotatable with respect to the first gear, a second shaft with gears thereon and a single shifting lever for sliding said first gears and disengaging the clutch, substantially as described.

35. In a motor vehicle, a gear case therefor, having a cover and supporting brackets, with a set of common securing bolts.

36. In a motor vehicle, the combination of a shaft therefor, formed in two parts, a fixed clutch member on one part, a movable clutch member on the other part, gears connected to said movable member, a plurality of auxiliary shafts, gears thereon, and means for sliding said movable clutch member and connected gears along the shaft to disengage the clutch and intermesh the gears *seriatim*, substantially as and for the purposes set forth.

37. In a motor vehicle, the combination with a shaft formed in two parts, of a clutch for connecting the parts together to cause the shaft to rotate as an entirety, slidable gears on the shaft parts connected to and working with one clutch member, auxiliary shafts with gears thereon, and means, which being moved, will first disengage the clutch and move the gears to a position to engage with the gears on one auxiliary shaft to cause the shaft parts to partake of the different speed relation, and a continuation of the movement will cause the gears to engage with the gears on the other auxiliary shaft and cause the shaft parts to rotate in opposite directions, substantially as and for the purposes set forth.

38. In a motor vehicle, the combination with an operating motor, of connections between the motor and the driving wheels, comprising a two-piece shaft connected thereto, connections between said shaft and driving wheels, a clutch connecting the two parts of the shaft, a gear carried by one part of the shaft, a second gear carried by the other part, connections between the gears and clutch for moving all together, an auxiliary shaft, two gears secured thereto, out of mesh with the other two gears at the high speed, a second auxiliary shaft, two gears secured thereto, normally out of mesh with the first two gears, intermediate gearing interposed between the two gears on the second auxiliary shaft, and means for disengaging the clutch, and intermeshing the different gears, whereby the two parts of the shaft may be caused to rotate in different speed relations.

39. In a motor vehicle, the combination with a driving shaft made in two parts, of a clutch connecting the two parts, a sleeve surrounding the abutting ends, of the two parts, a gear formed integral with the clutch, a second gear formed integral with the sleeve and engaging with the other part, and an auxiliary shaft, gears thereon, disengaged at the high speed and means for moving the sleeve, clutch and gears to disengage the two shaft parts and intermesh the gears, whereby the two parts of the shaft may be caused to rotate in different speed relations.

40. In a motor vehicle, the combination with a driving shaft made in two parts, of a clutch connecting the two parts, a sleeve surrounding the abutting ends of the two parts, a gear formed integral with the clutch, a second gear formed integral with the sleeve and engaging with the other part, an auxiliary shaft, gears thereon, disengaged at the high speed a second auxiliary shaft, gears thereon disengaged at the high speed, and means for moving the sleeve, clutch and gears to disengage the two shaft parts and intermesh the gears, whereby the two parts of the shaft may be caused to rotate in different speed relations.

41. In a motor vehicle, the combination with a driving shaft made in two parts, of a clutch connecting the two parts, a sleeve surrounding the abutting ends of the two parts, a gear formed integral with the clutch, and engaging with one part, a second gear formed integral with the sleeve and engaging with the other part, an auxiliary shaft, gears thereon, disengaged at the high speed, intermediate gearing interposed between the gears, and means for moving the sleeve, clutch and gears to disengage the two shaft parts and intermesh the gears, whereby the two parts of the shaft may be caused to rotate in different speed relations.

42. In a motor vehicle, the combination with a motor and driving wheels, of connections between said motor and the driving wheels, including a two-piece shaft, a clutch connecting the two shaft-pieces, gears upon the shaft pieces, an auxiliary shaft with gears thereon, said gears being so arranged as to be out of mesh when the clutch is engaged, and an element longitudinally shiftable as an entirety for actuating said clutch and intermeshing said gears, substantially as and for the purposes set forth.

43. In a motor vehicle, the combination with a shaft formed of two parts, one telescoping within the other, of a connecting clutch, a gear integrally formed upon one clutch member, a second gear connected to the first gear but freely rotatable with respect thereto a second shaft, and gears thereon and a single lever for shifting said first gears and actuating the clutch, substantially as described.

44. In a motor vehicle, the combination with the driving shaft formed in two parts, of a fixed clutch member on one part, a slidable clutch member on the other part, a gear rigidly connected to said slidable member, a gear rotatably connected to said slidable member, an auxiliary shaft, gears thereon and means for moving said slidable clutch member and connected gears along the shaft to disengage the clutch and intermesh the gears, substantially as and for the purposes set forth.

45. In a motor vehicle, the combination with an operating motor, of connections between the motor and the driving wheels, comprising a two-piece shaft connected thereto, connections between said shaft and driving wheels, a clutch connecting the two parts of the shaft, a gear carried by one part of the shaft, a second gear carried by the other part, connections between the gears and clutch for moving all together, an auxiliary shaft, two gears secured together, out of mesh with the other two gears at the high speed, a second auxiliary shaft, two gears secured thereto, out of mesh with the first two gears at the high speed, and means for disengaging the clutch and intermeshing the gears, whereby the two parts of the shaft may be caused to rotate in different speed relations.

46. In a motor vehicle, the combination of the driving wheels, the motor, the driving shaft between the motor and driving wheels made of two longitudinally alined sections, a clutch arranged to couple the sections so that the driving shaft may turn as an entirety, and longitudinally slidable speed reducing gearing arranged to connect the shaft sections, and so coördinated with said clutch that the engagement of said gearing will effect the prior disengagement of said clutch, and vice versa, substantially as described.

47. In combination in a change speed mechanism, a driving shaft, a driven shaft, gears mounted upon said driving shaft and driven shaft, intermediate gears on an axis in fixed relation with the axes of said driving and driven shafts, means for transmitting power from said driving shaft to said driven shaft through said intermediate gears, and means movable on the driven shaft for directly connecting the driving and driven shafts, with all intermediate gears at rest.

48. In combination in a change speed mechanism, a driving shaft and driven shaft arranged in the same axial line and adapted to have independent movement, change gears carried upon the driving and driven shafts, means for varying the position of said gears, power transmitting means adapted to connect a gear on said driving shaft with a gear on said driven shaft, and a clutch mechanism for directly connecting said driving and driven shafts.

49. In combination in a change speed mechanism, a driving shaft, a gear borne upon said shaft, a counter-shaft a gear borne upon the counter-shaft and meshing with the gear upon the driving shaft, a driven shaft operatively arranged with relation to the driving shaft and provided with a clutch mechanism adapted to clutch it directly to said shaft, and intermediate gears borne upon the driven shaft and counter-shaft, whereby the speed of the former may be varied with relation to the speed of the latter.

50. In combination in a change speed mechanism, a driving shaft and driven shaft, a driving gear for the former, a plurality of intermediate gears including a reversing gear and means for driving said driven shaft through any one of said intermediate gears.

51. In combination in a change speed mechanism, a driving shaft, a driven shaft, a plurality of transmission gears mounted to slide thereon, a plurality of intermediate gears arranged to engage and drive respectively, but singly, the said transmission gears, and means to couple said driven shaft directly to said driving shaft.

52. In a motor-vehicle, the motor, clutch, driving gear and driven shaft all axially alined, means to drive said driven shaft from said driving gear at the same and also at different speeds, a jack-shaft arranged at an angle with said driven shaft and driven therefrom, and vehicle driving-wheels connected with and driven from said jack-shaft.

53. In combination in a change speed mechanism, a driving shaft, a driven shaft, a counter-shaft in fixed relation to said driving and driven shafts, and operative gearing on said shafts, an inclosing casing, a bearing in said casing for one end of the driven shaft, the other bearing for said driven shaft being in the driving shaft.

54. In combination in a change speed mechanism, a driving shaft and a driven shaft operatively arranged, an inclosing casing, a bearing in said casing for one end of one of said shafts, the other end of said shaft having a bearing in the other shaft, a counter shaft in fixed relation to said driving and driven shafts and a plurality of gears connecting said counter driving and driven shafts.

55. In combination in a change speed mechanism, a driving shaft and a driven shaft axially alined, a counter shaft in fixed relation to said driving and driven shafts, a plurality of gears connecting said counter driving and driven shafts, an inclosing casing, a bearing in said casing for one end of the driven shaft, the other end having a bearing in the driving shaft.

56. In combination in a change speed mechanism, a driving shaft and a driven shaft, the driven shaft having a bearing in the driving shaft, and means movable on the driven shaft to engage the surrounding end of the driving shaft to rotate the two shafts at the same speed, a counter shaft in operative fixed relation to said driving and driven shafts, and a plurality of gears connecting said counter, driving and driven shafts.

57. In a transmission mechanism for motor vehicles; a casing, a driving shaft or shaft section projecting into said casing at one side, a bearing therefor in the wall of said casing, a gear and clutch part fixedly secured on or integral with said shaft section and entirely on one side of said bearing within said casing, a driven shaft in said casing having a movable complementary clutch part, a counter shaft in fixed relation to said driving and driven shafts, and a plurality of gears on said shafts whereby varying speeds are transmitted to a shaft projecting from said casing.

This specification signed and witnessed this 20th day of January, 1906.

LEONARD H. DYER.

Witnesses:
AUG. LONG,
JNO. ROBT. TAYLOR.